(12) United States Patent  (10) Patent No.: US 8,491,249 B2
Monti  (45) Date of Patent: Jul. 23, 2013

(54) STORAGE SYSTEM AND A METHOD FOR STORING CONTAINER ARTICLES SUCH AS BOTTLES OR SYRINGES

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 491 days.

(21) Appl. No.: 12/722,413

(22) Filed: Mar. 11, 2010

(65) Prior Publication Data

US 2010/0243501 A1    Sep. 30, 2010

(30) Foreign Application Priority Data

Mar. 24, 2009   (IT) .............. BO2009A0175

(51) Int. Cl.
*B65G 1/00*   (2006.01)
*B65G 65/00*   (2006.01)

(52) U.S. Cl.
USPC .......................................... 414/268; 414/279

(58) Field of Classification Search
USPC .............. 62/62; 198/347.1, 518; 294/81.61, 294/87.1; 414/222.01, 222.11, 224.01, 225.01, 414/226.01, 266–271, 273, 274, 277–279, 414/281, 287, 288, 294, 298, 300, 301
See application file for complete search history.

(56) References Cited

U.S. PATENT DOCUMENTS

| | | | | |
|---|---|---|---|---|
| 3,199,684 A | * | 8/1965 | Bradley | 211/74 |
| 3,283,918 A | * | 11/1966 | Devol | 198/575 |
| 3,327,450 A | * | 6/1967 | Carter | 53/496 |
| 3,774,774 A | * | 11/1973 | Menkel | 211/72 |
| 3,780,492 A | * | 12/1973 | Corderoy | 53/247 |
| 3,958,682 A | * | 5/1976 | Martin | 198/341.05 |
| 4,678,393 A | * | 7/1987 | Mink | 198/468.2 |
| 5,375,395 A | * | 12/1994 | Gmeiner | 53/493 |
| 5,402,875 A | * | 4/1995 | Markin et al. | 198/346.1 |

(Continued)

FOREIGN PATENT DOCUMENTS

DE   20 2006 009652 U1   10/2007
EP   0427683 A   5/1991

OTHER PUBLICATIONS

European Search Report, Jun. 2010.

*Primary Examiner* — Paul T Chin
*Assistant Examiner* — Brendan Tighe
(74) *Attorney, Agent, or Firm* — William J. Sapone; Ware Fressola Maguire & Barber LLP

(57) ABSTRACT

A storage system (100) and a method for storing container articles (2) such as bottles or syringes, the system (100) is of a type associable to at least a supply line (1) of the container articles (2). The system (100) comprises: at least a support member (7, 8, 9) arranged adjacent to the supply line (1), which support member (7, 8, 9) affords a plurality of seatings (14) arranged side-by-side in order each to receive a plurality of container articles (2); and means (6) for picking-up a group of container articles (2) from the supply line (1) and for positioning the group of container articles (2) in a corresponding seating of the support member (7, 8, 9). The method for storing container articles (2) which are bottles or syringes in a plurality of flanked seatings (14) of at least a support member (7, 8, 9) comprises steps of: picking-up a group of container articles (2) from a supply line (1); and positioning the group of container articles (2) in a corresponding seating (14) of the support member (7, 8, 9).

5 Claims, 4 Drawing Sheets

U.S. PATENT DOCUMENTS

| | | | |
|---|---|---|---|
| 5,771,657 A * | 6/1998 | Lasher et al. | 53/55 |
| 5,797,515 A * | 8/1998 | Liff et al. | 221/2 |
| 5,934,859 A * | 8/1999 | Goetzelmann | 414/416.08 |
| 6,012,595 A * | 1/2000 | Thilly | 211/60.1 |
| 6,044,648 A * | 4/2000 | Rode | 62/62 |
| 6,267,256 B1 * | 7/2001 | Thilly | 211/60.1 |
| 6,371,717 B1 | 4/2002 | Grams et al. | |
| 6,516,935 B1 * | 2/2003 | McLennan | 198/347.3 |
| 7,229,110 B1 * | 6/2007 | Tye | 294/87.1 |
| 7,309,203 B2 * | 12/2007 | Clark et al. | 414/736 |
| 7,386,965 B2 * | 6/2008 | McErlean et al. | 53/135.2 |
| 7,717,255 B2 * | 5/2010 | Scott et al. | 198/867.11 |
| 2003/0168873 A1 * | 9/2003 | Lanfranchi et al. | 294/87.1 |
| 2005/0149226 A1 * | 7/2005 | Stevens et al. | 700/214 |
| 2006/0259195 A1 * | 11/2006 | Eliuk et al. | 700/245 |
| 2007/0010911 A1 * | 1/2007 | Feingold et al. | 700/245 |
| 2007/0081879 A1 * | 4/2007 | Bonora et al. | 414/217 |
| 2010/0243501 A1 * | 9/2010 | Monti | 206/446 |

* cited by examiner

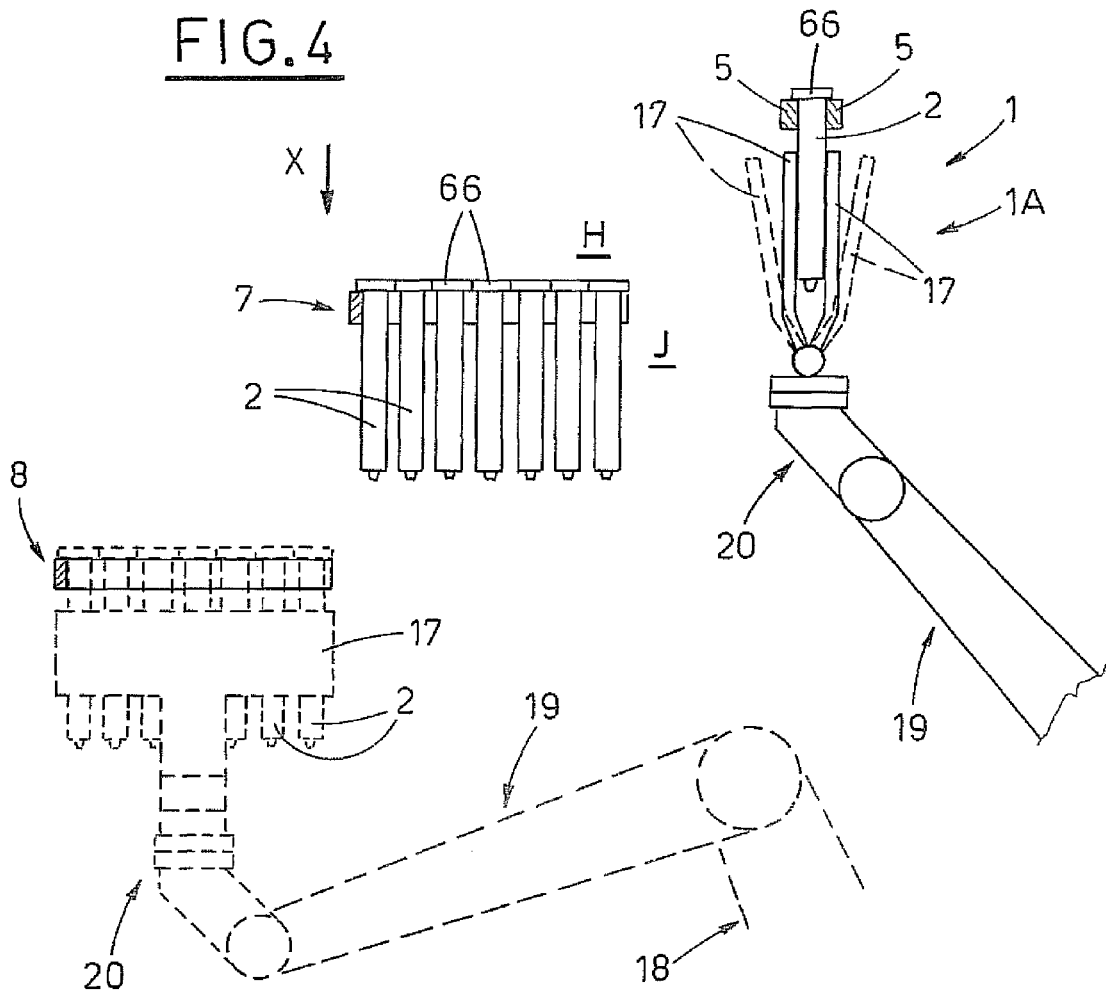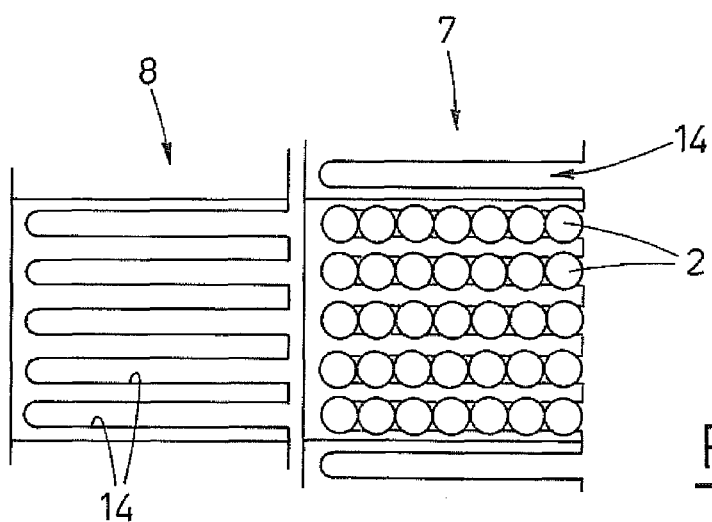

STORAGE SYSTEM AND A METHOD FOR STORING CONTAINER ARTICLES SUCH AS BOTTLES OR SYRINGES

FIELD OF THE INVENTION

The invention relates to the technical field of production lines in plants for realising and filling container articles, in particular bottles or syringes, and for subsequent packing thereof. In greater detail, the invention relates to a storage system for articles associated to a production line for coordinating the functioning of work machines or stations arranged along the production line itself.

DESCRIPTION OF THE PRIOR ART

A well-known need in the field is the functional coordination of operating stations having different production speeds and arranged in series along a production line.

In this respect, article storage systems are usually used in order to dynamically absorb a part of the articles placed in outlet by a first work station and to then make the articles available to an inlet of a second work station arranged downstream of the first; this has the aim of regulating the functioning between work stations operating at different working speeds, and also has the aim of guaranteeing a continuous functioning of a production branch arranged downstream of the storage system when, for example, the production branch upstream is halted (for example due of an unexpected malfunctioning), or vice versa.

A system for storing bottles, of known type, is arranged flanked to a tract of production line and comprises first and second switcher means and a storage buffer of articles.

The first switcher means are arranged at a first point in the production line and are activatable in order to deviate the flow of articles transiting on the line towards the buffer; the buffer internally comprises conveyor belts and lateral guide borders which define, overall, a trajectory generally developing in a serpentine, in order to maximize the storage capacity of the buffer. The second switcher means are located downstream of the first switcher means, at a second point in the production line, and are activatable to newly introduce the flow of articles coming from the outlet section of the serpentine trajectory, onto the production line.

The serpentine trajectory defined by the conveyor belts and the lateral borders causes numerous impacts of the articles against one another and against the borders, with possible damage to or breakage of the articles; further, there is frequent malfunctioning of the storage system, caused by blocking of the articles at the bends in the serpentine trajectory.

SUMMARY OF THE INVENTION

In the light of the above, the aim of the present invention consists in providing a technical solution which intends to obviate the above-cited drawbacks in storage systems of known type, and thus provide a new storage system which limits the impacts the articles are subjected to.

A further aim of the invention consists in providing a storage system the costs of which are counter-balanced by the results that are to be achieved.

A still further aim of the present invention consists in providing a method for article storage which enables the problems in the known-type solutions to be solved.

The above aims are attained with a storage system for articles, and a method for storing articles.

The storage system for container articles, namely bottles or syringes, is of a type associable to at least a supply line of container articles and comprises: a buffer store arranged adjacent to the supply line, comprising a support member which forms a plurality of flanked seatings, each of which receives a plurality of container articles; and means for picking up a group of container articles from the supply line and positioning them in a corresponding seating of the support member.

The method for storing container articles, namely bottles or syringes, in a plurality of adjacent seatings of at least a support member, comprises stages of: picking up a group of container articles from a supply line; and positioning the group of container articles in a corresponding seating of the support member.

The picking-up of an entire group of articles from the supply line and the positioning of the group of articles in a corresponding seating of the support member advantageously prevents the articles from jostling one another; the articles are in fact removed contemporaneously from the supply line on which, for example, they are arranged in a line.

The support member is arranged adjacent to the supply line, so that it does not have a direct influence on the regular functioning of the line.

The storage system thus defined is compact, reliable and economical if compared with storage systems of known type.

The picking-up and positioning means operate functionally between the supply line and the support member; the picking-up and position means are easily accessible and are replaceable easily and rapidly.

In an aspect of the invention, the system comprises a plurality of support members that are arranged at different heights from one another.

This is particularly advantageous if it is desired to obtain a FIFO (first in first out) functioning of the storage system, while maintaining a good article storage capacity.

FIFO functioning requires that each group of articles removed from the supply line be inserted in a respective seating of the selected support member, such that a single seating is associated to each group of articles. Each group of articles must however be made up of a limited number of articles, both for production reasons and for a rational sizing of the picking-up and positioning means.

The arrangement of the support members at different heights thus enables a containing of the size of the system in relation to a predetermined and desired storage capacity thereof.

In an aspect of the invention, the support members are further arranged staggered such as not to be superposed on one another; in this way any powder or liquid substance that accidentally falls from a support member (for example dirt or a partial leak of liquid or powder substances from an article arranged in a seating) does not pollute the member or members of the underlying support. In other words, each support member is arranged such as not to be even partially superposed on another support member.

The staggered arrangement of the support member is seen to be particularly advantageous when the system of the invention is used internally of a controlled-atmosphere environment in which a constant laminar flow of a fluid is applied, for example directed vertically; in this way each article, whether a bottle or a syringe, is invested by the laminar flow at the mouth thereof.

Each support member can be arranged at a determined height with respect to the rest base of the storage system; in this way the space beneath each support member can be left substantially free in order to enable movement of the pick-up and positioning means and in order to facilitate the cleaning operations of any powder or liquid substances which might have fallen from the support members. Additionally, in this respect, it is preferable that each support member be fixed to a frame of the storage system in order to be suspended; for example each support member can be suspended from above or be fixed to a lateral wall of the frame in order to project.

Preferably the storage system is configured such that the pick-up and positioning means act on the container articles from below or laterally, in any case such that the pick-up and positioning means does not even partially superpose the container articles to be collected, such that any dust or powder or dirt borne by the pick-up and positioning means cannot fall onto the container articles when they are on the supply line or in the seatings of the support members. If the support members are arranged staggered, the pick-up and positioning means cannot even pollute any other support member arranged beneath the support member on which the means are operating, which is a particularly advantageous fact for example when using the system of the invention internally of controlled-atmosphere environments.

BRIEF DESCRIPTION OF THE DRAWINGS

Specific embodiments of the invention, and advantageous technical-functional characteristics thereof correlated to the embodiments in part deducible from the above description, are described in the following, in agreement with what is contained in the claims and with the aid of the accompanying figures of the drawings, in which:

FIG. 4 is an enlarged view of a region K of FIG. 3 in which two different operating configurations of the storage system are illustrated;

FIG. 5 is the view according to the arrow X of a part of the region illustrated in FIG. 4.

DESCRIPTION OF PREFERRED EMBODIMENTS

Figure 1:
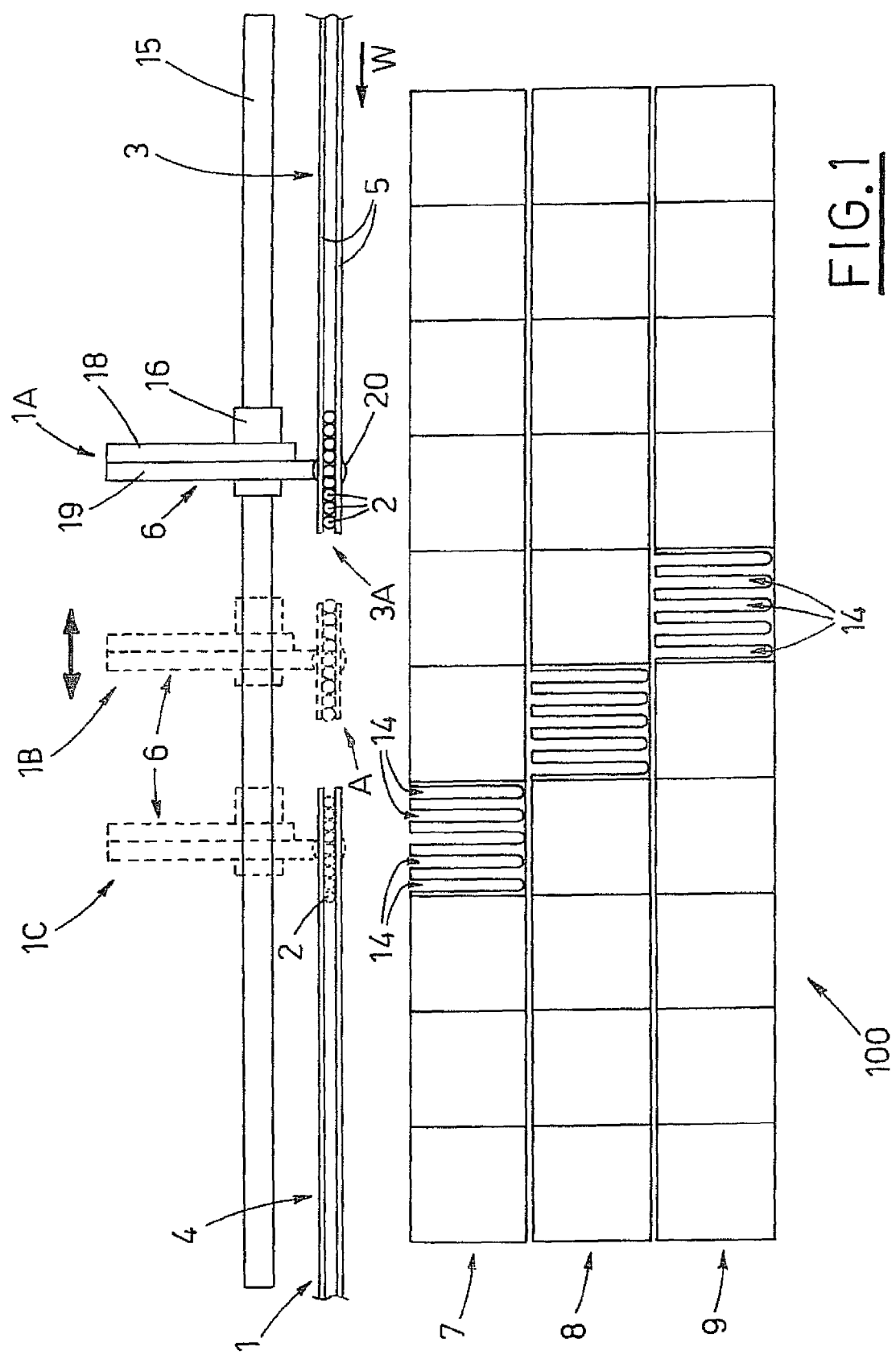
FIGS. 1 and 2 are respective schematic view of above of a supply line of container articles and the storage system of the present invention, in different operating configurations thereof.

With reference to the tables of drawings, 1 denotes in its entirety a supply line of container articles 2 arranged in a line; the container articles 2 of the illustrated example in the figures are syringes but they could also be bottles. In general, these articles are suitable for containing pharmaceutical or cosmetic substances in liquid or powder form.

The supply line 1 us interrupted (but alternatively could be continuous) in a zone A for forming two separate branches, i.e. a first upstream branch 3 and a second downstream branch 4. The supply line 1 functionally joins operating machines or stations, not indicated in the figures, which are arranged in series in a production plane; by way of example, the production plant is designed for realising and filling container articles 2 and for subsequent packing thereof.

In a known way, the two branches 3, 4 comprise belts 5 for transporting the syringes 2 in an advancement direction W; the syringes 2 comprise a collar 66 (FIG. 4) destined to rest on the belts 5.

The storage system of the present invention, denoted by reference number 100, comprises a robot 6 and a plurality of support members 7, 8, 9, for example three.

Figure 3:
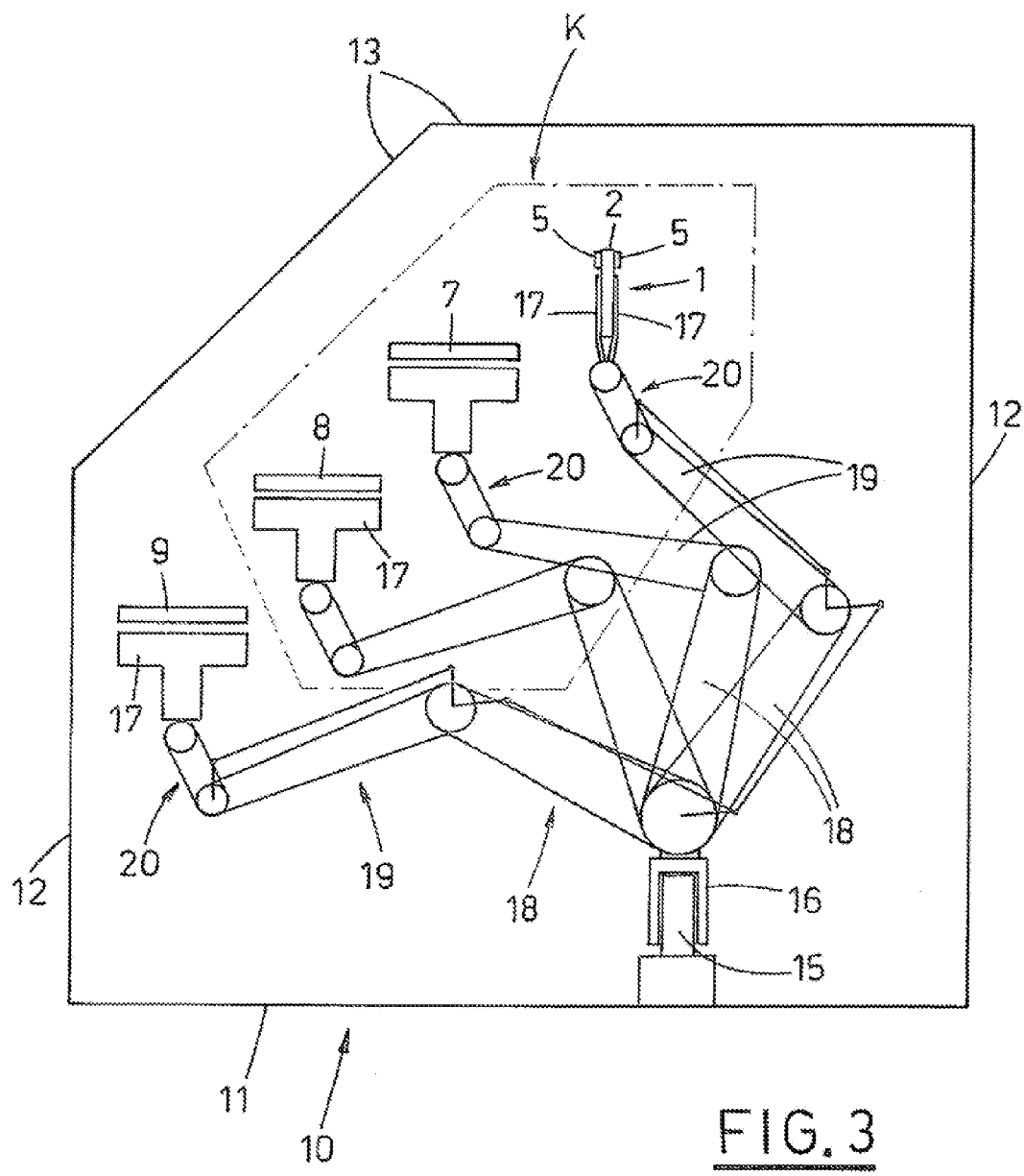
FIG. 3 illustrates, in enlarged scale, a schematic lateral view of the supply line of container articles and the storage system of the invention, in different operating configurations thereof.

The storage system 100 further comprises a frame 10 represented only schematically in FIG. 3, having a base 11, lateral walls 12 and upper walls 13.

Each support member 7, 8, 9 is fixed to the frame 10 of the storage system 100 in a way which is not illustrated, in order to be suspended: thus each support member 7, 8, 9 is fixed to the upper walls 13 or lateral walls 12 of the frame 10, and possibly projects. In any case each support member 7, 8, 9 is fixed such as to leave free, or at least not to interfere with, the relative region of underlying space, for reasons which will emerge herein below.

Each support member 7, 8, 9 is arranged parallel to the supply line 1, has a planar form and affords a succession of lateral openings 14 that are mutually flanked and parallel, as well as facing the supply line 1 (FIGS. 1, 2, 5); each lateral opening 14 further places the regions of space overlying H and underlying J the opening 14 in communication (FIG. 4); further, each lateral opening 14 develops in a longitudinal direction and is of such a size as to restingly receive a plurality of syringes 2 arranged in a line, contacting the collars 66 thereof (FIG. 4).

In other words, each lateral opening 14 is conformed such as to enable insertion or extraction of a group of syringes 2 in a line in a parallel direction to the longitudinal development of the opening 14 itself. Each lateral opening 14, therefore, conforms a corresponding seating for receiving the syringes 2.

Figure 2:
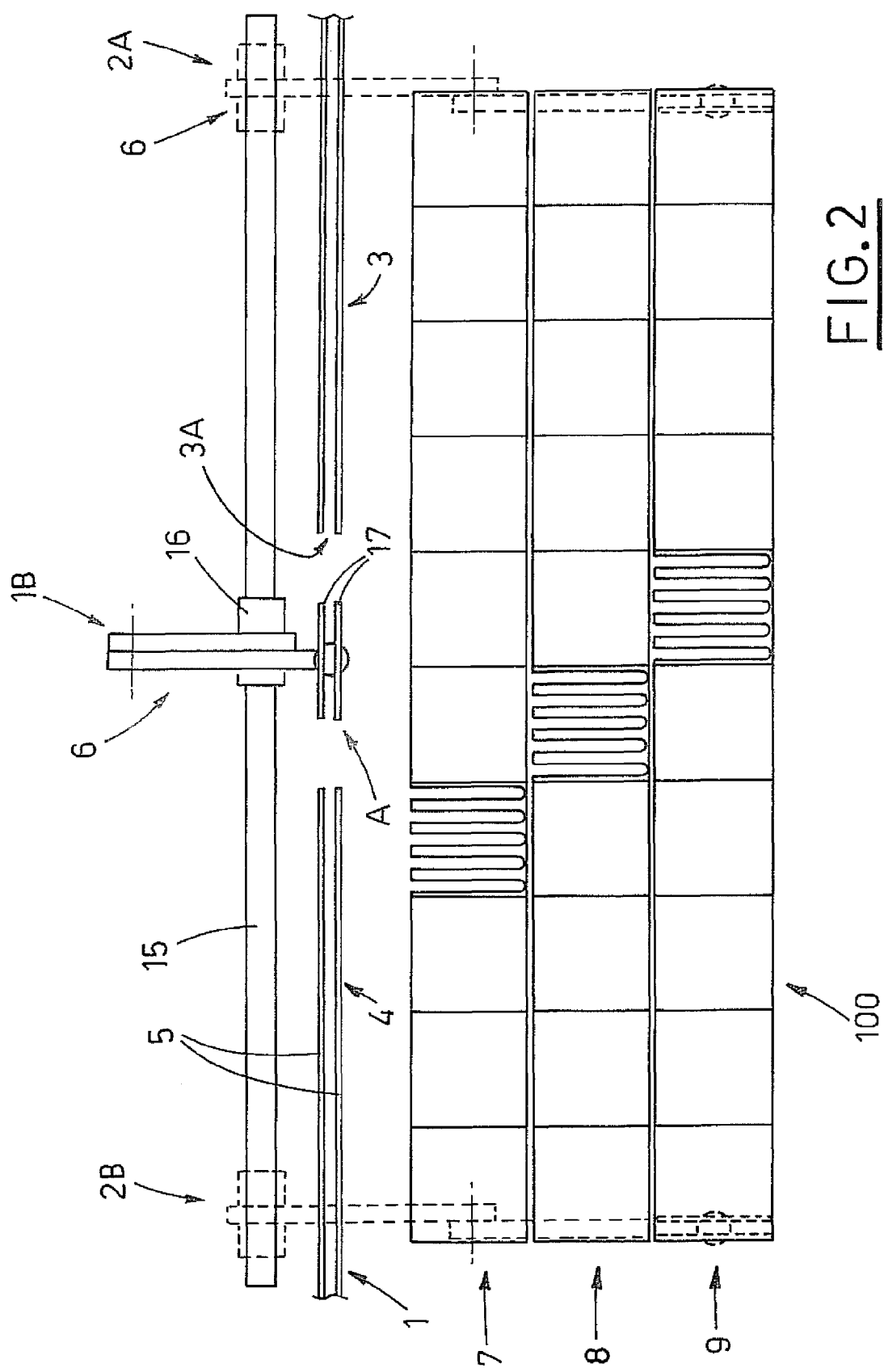

For reasons of simplicity, FIGS. 1 and 2 schematically illustrate only some lateral openings 14. In any case, in a view from above each support member 7, 8, 9 has a comb-shape.

With reference to FIG. 3, each support member 7, 8, 9 is arranged at a certain height from the base 11 of the frame 10.

The support members 7, 8, 9 are arranged at different heights to one another and are staggered both vertically and horizontally. In detail, they are horizontally staggered such as not to be superposed on one another, even partially; in this way any substance, for example liquid or powder, falling from a support member 7, 8, 9 cannot pollute an underlying support member 7, 8, 9. The support members 7, 8, 9 are further staggered vertically as much as is necessary for enabling the introduction and extraction operations of the groups of syringes 2 into and from the seating 14 of a support member 7, 8, 9 to be achieved, such that any presence of groups of syringes 2 in the seatings of adjacent support members 7, 8, 9 cannot constitute an obstacle (for example the introduction of a group of syringes 2 into a seating 14 of the support member 8 must not be obstructed by the presence of syringes 2 in one or more seatings 14 of the member 7).

The arrangement of support members 7, 8, 9 and the fastening system thereof to the frame 10 is such as to make their removal simple in order to facilitate cleaning and/or replacement operations should the sizes of the syringes 2 require this.

The storage system 1 comprises a guide 15 which develops parallel to a the development of the support members 7, 8, 9.

The robot 6 comprises: a carriage 16 which slides on the guide 15, a plurality of arms 18, 19, 20 hinged to one another hinged at a side thereof to the carriage 16 in order to act on an operating area (not specifically illustrated in the drawings) located on a perpendicular plane to the sliding direction of the carriage 16, the operating area embracing the support members 7, 8, 9 and the supply line 1; and pliers 17 borne by the plurality of hinged arms 18, 19, 20 for picking up groups of syringes 2 arranged in a line on the supply line 1 or in the seatings 14 of the support members 7, 8, 9, the pliers 17 being coupled to the plurality of hinged arms 18, 19, 20 at a free end thereof (see FIG. 3, for example).

The robot 6 is designed to simulate the movement of a human limb; therefore the articulated arms 18, 19, 20 and the pliers 17 have an anthropomorphic operation.

The robot 6 can operate in various operative configuration, as described herein below.

FIG. 1 illustrates, in a continuous line, the robot 6 during a stage of picking up a group of syringes 2 arranged in the upstream branch 3 of the supply line 1, in proximity of the relative outlet section 3A (this position of the robot 6 has been denoted with reference number 1A in FIGS. 1 and 4). The pliers 17 (see FIG. 4 for reference), initially open in order to enable correct positioning of the robot 6, are subsequently activated to grip the group of syringes 2; the shape of the pliers 17 is for example as illustrated in FIG. 4.

Then the robot 6 is moved to cross the interruption zone A (the corresponding position of the robot 6 has been denoted with reference 1B) up to reaching the downstream branch 4 (position 1C of the robot 6). The robot 6 thus removes the group of syringes 2 from the belts 5 of the upstream branch 3 in a parallel movement to the development of the branch 3 and introduces the group of syringes 2 into the downstream branch 4 with a similar movement, parallel to the development of the downstream branch 4; the syringes 2 are arranged on the downstream branch 4 such that the collars 66 thereof go to rest on the belts 5 of the downstream branch 4.

The functioning of the above-described robot 6, in which the groups of syringes 2 coming from the upstream branch 3 are located time-by-time on the downstream branch 4, represents a first functioning mode in which it is not necessary to have recourse to the storage capacity offered by the support members 7, 8, 9. This functioning mode can be maintained for a longer or shorter period according to the characteristics of the operating stages, not illustrated, that are situated upstream and downstream of the supply line 1.

By way of example, if the above-mentioned operating stations have the same operating speeds, the storage system 100 will not have need of the storage space offered by the support members 7, 8, 9.

In a case of malfunctioning of the upstream station, the storage system 100 can be used by the support member 7, 8, 9 in order to supply the operating station arranged downstream, by progressively extracting the syringes 2 from the support members 7, 8, 9. If there is a malfunctioning of the station arranged downstream, the storage system 100 can store, in the support members 7, 8, 9, the syringes 2 supplied on the upstream branch 3 of the operating station arranged upstream. In both cases, the storage system 100 is able to guarantee functioning of a production branch of the plant, respectively the production plant which comprises the downstream branch 4 and the operating stations arranged downstream and the production branch which comprises the upstream branch 3 and the operating stations arranged upstream.

Combined functioning modes with respect to those described above can be used in a case in which the operating stations operate at different production speeds.

FIG. 2 illustrates the robot 6 in a position corresponding to the position denoted as 1B in FIG. 1 and in another two extreme positions, denoted with a dotted line in FIG. 2 as 2A, 2B. These two extreme positions 2A,2B show that the robot 6 can reach any zone of the support member 7, 8, 9 in order to introduce or extract groups of syringes 2 from the seatings 14 thereof; in this regard, the guide 15 extends parallel to the development of the support members 7, 8, 9 for an extension at least equal to that of the support members 7, 8, 9.

FIG. 3 schematically illustrates the robot 6 in four possible operating configurations in order to act on the syringes 2 arranged on the supply line 1 and in the seatings 14 of the support members 7, 8, 9.

As can be seen, the storage system 100 taken as a whole is of such dimensions and is arranged with respect to the supply line 1 such that the robot 6 operates on the syringes 2, and is always maintained below the belts 5 of the supply line 1 and below the support members 7, 8, 9 on which it acts time by time. The pliers 17 are moved to reach and intercept the groups of syringes 2 by means of a movement from below or from the side. In other words, no part of the robot 6 is ever, during functioning, above (i.e. superposed even partially) a syringe 2 or group of syringes 2 arranged on the supply line 1 or in the seatings 14 of the support members 7, 8, 9; it follows that the robot 6 cannot pollute the syringes 2 with dust, powder or liquid substances (for example: lubricants of mechanical parts of the robot) or powder falling therefrom. These substances, which may be present on the robot 6, fall onto the base 11 of the frame 10 and are thus easily removable.

The regions underlying the support member 7, 8, 9 are advantageously free to allow movement of the robot 6 and to facilitate the cleaning operations of the dirt and liquid and powder substances falling from the support member 7, 8, 9 of the syringes 2 arranged thereon and from the robot 6. For this purpose, a hatch afforded in a lateral wall 12 of the frame 10, not indicated in the figures, can give easy access to the region of free space in order to enable cleaning operations to take place.

FIG. 4 illustrates two consecutive operating configurations of the robot 6: in the first operating configuration, shown with a continuous line, the pliers 17 pick up a group of syringes 2 from the upstream branch 3 of the supply line 1; in the following operating configuration, shown with a dotted line, the robot 6 has located the group of syringes 2 in a corresponding seating 14 of the support member 8.

Thus a method is defined for storing syringes 2 in the flanked seatings 14 of support members 7, 8, 9 comprising stages of:

picking-up a group of container articles 2 from a supply line 1; and positioning the group of container articles 2 in a corresponding seating 14 of the support member 7, 8, 9.

It is specified that the enclosed figures are only by way of example. Other reciprocal arrangements of the branches 3, 4 of the supply lines 1, the support members 7, 8, 9 and the assembly formed by the robot 6 and the guide 15 are possible in order to obtain a like functioning to the one described herein above and falling within the scope of protection of the invention. For example, the two branches 3, 4 can be arranged perpendicular to one another, with the guide 15 and the support member 7, 8, 9 arranged parallel to one of the two branches 3, 4 (embodiment not illustrated)

Further, with reference to FIG. 3, a different relative arrangement of the support members 7, 8, 9 with respect to the supply line 1 is possible, for example while keeping the guide 15 and the robot 6 positions the same; by way of example, the support members 7, 8, 9 can be distributed to both sides of the supply line 1; in other words, by way of example, it would be possible to exchange the positions occupied by the support members 8 and the supply line 1.

A like storage system 100 is particularly advantageous if used internally of a controlled-atmosphere environment, in which a constant laminar flow of a fluid is applied, for example vertically directed.

A control unit, not denoted, establishes the filling order of the groups of syringes 2 in the seatings 14 of the support members 7, 8, 9; the characteristics of the storage system 100 of the present invention enable a considerable flexibility from this point of view; the support members 7, 8, 9 can in fact be filled with groups of syringes 2 in various ways.

The functioning of the storage system can be of the FIFO (first in first out) type; in this case each seating 14 is filled with a single group of syringes 2. Each seating 14 is for example of such dimensions as to be able to receive only the syringes 2 of a group of syringes 2 collected from the supply line 1 by the robot 6; since the number of syringes 2 collectable from the supply line 1 depends on the conformation of the pliers 17, the dimensions of the pliers 17 and each seating 14 are interconnected.

The control unit can manage a FIFO type functioning extremely flexibly thanks to the versatile characteristics of the storage system 100 which is the object of the present invention.

The above description is intended purely by way of non-limiting example, so that any constructional variants are deemed to enter into the scope of protection of the present technical solution, as described herein above and as claimed herein below.

What is claimed is:

1. A storage system for container articles such as bottles or syringes, the system associated with a supply line of the container articles, the system comprising:
   a frame having a base, lateral walls and upper walls, the frame arranged parallel to a supply line, the supply line located at a predetermined height with respect to the base of the frame,
   a plurality of support members, each support member having a longitudinal planar form and being arranged adjacent to the supply line, each support member having a plurality of lateral openings arranged side-by-side in order to define seatings which receive a group of container articles, the support members being fixed to the frame at different heights from one another relative to the base of the frame and being staggered relative to one another vertically and horizontally so as not to be superposed on one another to define an underlying region of free space, such that the support members are arranged parallel to the supply line with the openings defining the seatings for the group of container articles facing the supply line,
   a guide fixed on the base of the frame and extending in a direction parallel to the longitudinal development of the support members and the supply line and a carriage for sliding on the guide;
   means for picking up the group of container articles carried by the carriage, the means for picking up comprising an assembly of a plurality of arms each hinged to one another, the assembly hinged to the carriage at one end of the assembly and to pliers at an end of the assembly opposite the carriage connection, the assembly of a plurality of arms being arranged and configured with respect to the supply line and to the support members such that the pliers are maintained below the supply line and below the support members such that the picking up means pick up the group of containers from below for transfering and positioning the picked up group of container articles in seatings of the support members while always remaining below the support members.

2. The system of claim 1, wherein the arms are coupled to one another in order to have an anthropomorphic function.

3. The system of claim 1, wherein the supply line is interrupted in order to form two separate branches, being a first branch arranged upstream and a second branch arranged downstream, and wherein the means for picking-up and positioning are arranged such as to pick-up the container articles from the first branch in a parallel direction to the development of the first branch.

4. The system of claim 1 wherein the container articles are syringes, each provided with a collar, wherein the seatings of each support member are respective lateral openings having a longitudinal development and being of such dimensions as to engage the collars of the syringes.

5. The system of claim 1 wherein the system is located within a controlled atmosphere environment and further comprising means for applying a constant laminar flow to strike the container articles arranged in the seatings of each support member.

* * * * *